(12) United States Patent
Whittemore et al.

(10) Patent No.: US 10,659,302 B2
(45) Date of Patent: May 19, 2020

(54) CONFIGURING COMPUTING DEVICES USING A BOOTSTRAP CONFIGURATION

(71) Applicant: Apple Inc., Cupertino, CA (US)

(72) Inventors: Mark W. Whittemore, Los Altos, CA (US); Michael D. Santos, Campbell, CA (US); Todd R. Fernandez, Mountain View, CA (US); Christopher G. Skogen, Los Altos Hills, CA (US); Jussi-Pekka Mantere, Mountain View, CA (US); David Rahardja, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 16/186,141

(22) Filed: Nov. 9, 2018

(65) Prior Publication Data

US 2019/0081860 A1 Mar. 14, 2019

Related U.S. Application Data

(63) Continuation of application No. 15/287,196, filed on Oct. 6, 2016, now Pat. No. 10,164,833, which is a continuation of application No. 13/913,219, filed on Jun. 7, 2013, now Pat. No. 9,467,334.

(51) Int. Cl.
*H04L 12/24* (2006.01)
*G06F 9/4401* (2018.01)
*H04L 29/08* (2006.01)

(52) U.S. Cl.
CPC ........ *H04L 41/0853* (2013.01); *G06F 9/4411* (2013.01); *G06F 9/4416* (2013.01); *H04L 41/0806* (2013.01); *H04L 41/0816* (2013.01); *H04L 41/22* (2013.01); *H04L 67/34* (2013.01)

(58) Field of Classification Search
None
See application file for complete search history.

(56) References Cited

U.S. PATENT DOCUMENTS

| | | |
|---|---|---|
| 6,643,694 B1 | 11/2003 | Chernin |
| 6,735,692 B1 | 5/2004 | Murphrey et al. |
| 7,065,649 B2 | 6/2006 | Carbone et al. |
| 7,139,816 B2 | 11/2006 | Anand et al. |
| 8,706,845 B2 | 4/2014 | Song et al. |
| 8,931,065 B2 | 1/2015 | Luo |
| 2002/0083206 A1 | 6/2002 | Volpano |
| 2005/0047046 A1 | 3/2005 | Natarajan |
| 2006/0047823 A1 | 3/2006 | Cheng |
| 2007/0143466 A1 | 6/2007 | Shon et al. |
| 2008/0155071 A1 | 6/2008 | Lindstrom |
| 2009/0019167 A1 | 1/2009 | Taaghol |
| 2009/0292909 A1 | 11/2009 | Feder et al. |
| 2010/0180016 A1 | 7/2010 | Bugwadia et al. |
| 2011/0004747 A1 | 1/2011 | Venkatachalam |

*Primary Examiner* — Brian Whipple
(74) *Attorney, Agent, or Firm* — Invoke

(57) ABSTRACT

In the described embodiments, a device configuration file is used to set configuration settings on a computing device during a configuration operation (e.g., an initial configuration or a re-configuration of the computing device). The device configuration file is retrieved from a location where the device configuration file is hosted using a reference to the location from a bootstrap configuration. The bootstrap configuration is provided by a bootstrap configuration server and is retrieved by the computing device from the bootstrap configuration server during the configuration operation.

20 Claims, 7 Drawing Sheets

BOOTSTRAP CONFIGURATION 300

| METADATA 400 |
|---|
| REFERENCE TO LOCATION 402 |
| CONFIGURATION INFORMATION 404 |

FIG. 4

LIST OF DEVICES 302

| METADATA 500 ||
|---|---|
| DEVICE IDENTIFIER 502 | BSC 508 |
| DEVICE IDENTIFIER 504 | BSC 510 |
| ... | ... |
| DEVICE IDENTIFIER 506 | BSC 512 |

FIG. 5

LIST OF PURCHASED DEVICES 304

| METADATA 600 |
|---|
| DEVICE IDENTIFIER 602 |
| DEVICE IDENTIFIER 604 |
| ... |
| DEVICE IDENTIFIER 606 |

FIG. 6

DEVICE CONFIGURATION FILE 320

| METADATA 700 |
|---|
| CONFIGURATION SETTING 702 |
| CONFIGURATION SETTING 704 |
| ... |
| CONFIGURATION SETTING 706 |

FIG. 7

CONFIGURING COMPUTING DEVICES USING A BOOTSTRAP CONFIGURATION

INCORPORATION BY REFERENCE; DISCLAIMER

Each of the following applications are hereby incorporated by reference: application Ser. No. 15/287,196 filed Oct. 6, 2016; application Ser. No. 13/913,219 filed Jun. 7, 2013. The Applicant hereby rescinds any disclaimer of claim scope in the parent application(s) or the prosecution history thereof and advises the USPTO that the claims in this application may be broader than any claim in the parent application(s).

BACKGROUND

Field

The described embodiments relate to computing devices. More specifically, the described embodiments relate to configuring computing devices using a bootstrap configuration.

Related Art

As computing devices (e.g., laptops, tablet computers, etc.) become smaller, less expensive, and more powerful, entities (e.g., businesses, schools, institutions, etc.) have become more willing to provide computing devices to larger groups of users (e.g., employees, students, members, etc.). However, some entities have been hampered in providing computing devices to larger groups of users because providing support for larger groups of computing devices is costly and difficult. For example, some entities would prefer to provide computing devices with certain configuration settings (e.g., wireless network settings, email server settings, usage restrictions, etc.) so that the computing device would be used as the entity intends (e.g., with the entity's wireless network or email servers, etc.). Providing computing devices in this way typically requires a technician for the entity to individually configure each computing device or requires a user of each computing device to configure the computing device, which increases the cost and difficulty of providing computing devices.

BRIEF DESCRIPTION OF THE FIGURES

FIG. 4 presents a block diagram illustrating a bootstrap configuration in accordance with some embodiments.

FIG. 5 presents a block diagram illustrating a list of devices in accordance with some embodiments.

FIG. 6 presents a block diagram illustrating a list of purchased devices in accordance with some embodiments.

FIG. 7 presents a block diagram illustrating a device configuration file in accordance with some embodiments.

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
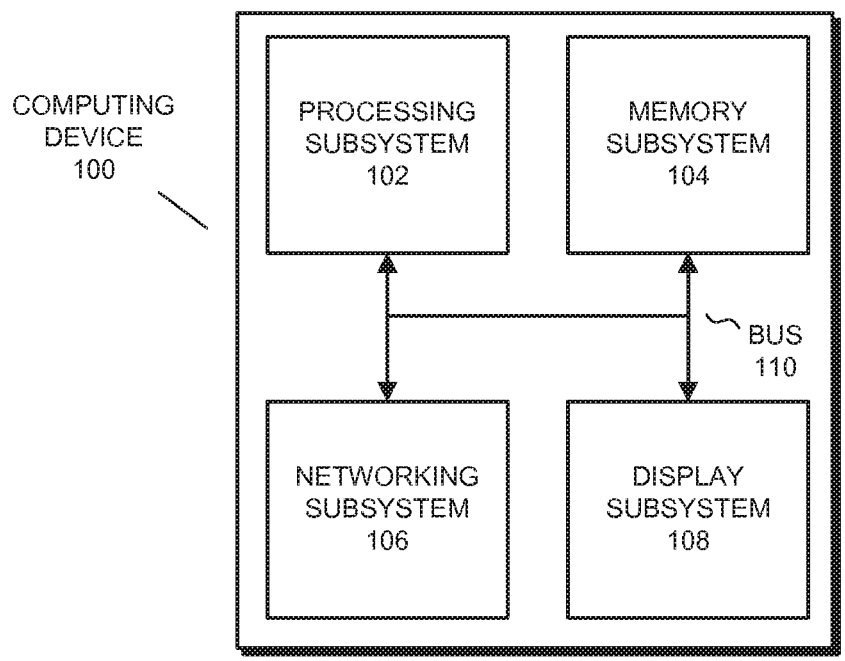
FIG. 1 presents a block diagram illustrating a computing device in accordance with some embodiments.
Figure 2:
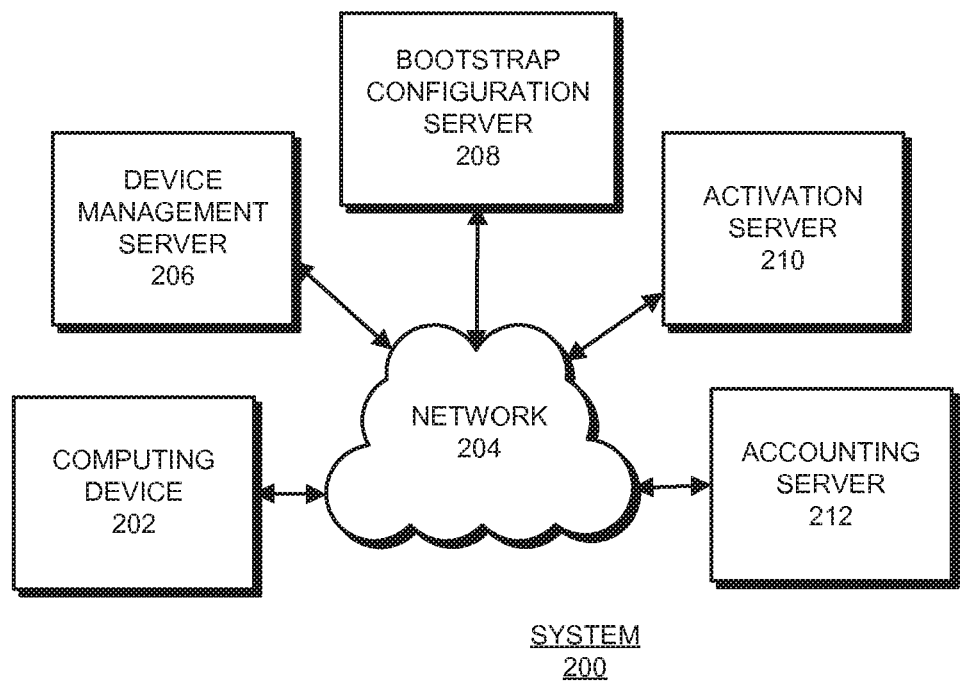
FIG. 2 presents block diagram illustrating a system in accordance with some embodiments.

In some embodiments, a computing device (e.g., computing devices as shown in FIGS. 1 and 2, etc.) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape. CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

Overview

The described embodiments include a system that enables an entity that controls configuration settings (e.g., an owner, an administrator, etc.) on a computing device (e.g., a laptop computer, a tablet computer, and/or other computing device) to provide a device configuration file to the computing device, as well as performing ongoing/subsequent management operations. During a configuration operation (i.e., initial configuration or re-configuration of the computing device), the computing device uses the device configuration file to assist in configuring the computing device. For example, the device configuration file may include network settings, a network proxy identification, usage restrictions, calendar information, and/or other configuration settings that are used when setting corresponding settings in the computing device.

These embodiments use a bootstrap configuration to assist the entity that controls the configuration settings of the computing device in providing the device configuration file to the computing device. The bootstrap configuration includes a reference to a location on a server where the device configuration file is hosted. For example, the bootstrap configuration may include a universal resource locator (URL), an address, and/or another reference to the location. When performing the configuration operation, the computing device acquires the bootstrap configuration file and then uses the reference to the location from the bootstrap configuration file to retrieve the device configuration file from the server.

These embodiments enable an entity that control device settings for a computing device to more easily provide configuration information to the computing device by using a bootstrap configuration to indicate a location of a device configuration file and enable the entity to perform ongoing management of the computing device. This technique extends to a larger number of computing devices, enabling the entity to configure the computing devices with less effort and expense than is required in existing systems (where, for example, a technician or a user performs one or more operations to set the configuration settings in each computing device). Because configuration is easier and less expensive, an entity (e.g., a business, an institution, a school, etc.) can more easily and cheaply support larger numbers of computing devices.

Computing Device

FIG. 1 presents a block diagram illustrating computing device 100 in accordance with some embodiments. Computing device 100 includes processing subsystem 102, memory subsystem 104, networking subsystem 106, and display subsystem 108.

Processing subsystem 102 comprises one or more circuits, mechanisms, computer-readable storage mediums, and/or functional blocks configured to perform computational operations for computing device 100. For example, processing subsystem 102 may include one or more processors (central processing units (CPUs) or CPU cores, graphics processing units (GPUs), systems on a chip (SOC), etc.), application-specific integrated circuits (ASICs), microcontrollers, and/or programmable-logic devices.

Memory subsystem 104 comprises one or more circuits, mechanisms, computer-readable storage mediums, and/or functional blocks configured to store data and/or instructions for processing subsystem 102 and networking subsystem 106. For example, memory subsystem 104 may include random access memory such as dynamic random access memory (DRAM) and/or other types of memory, along with mechanisms for controlling access to the memory. In some embodiments, memory subsystem 104 includes a memory hierarchy with an arrangement of one or more caches coupled to a memory for computing device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory circuits in memory subsystem 104 can be used by computing device 100 as fast-access storage for often-used data, while the mass-storage device is used to store less frequently used data.

Networking subsystem 106 comprises one or more circuits, mechanisms, computer-readable storage mediums, and/or functional blocks configured to couple to and communicate on a wired and/or wireless network. For example, networking subsystem 106 may include a Bluetooth™ networking system, a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network such as a WiFi network), an Ethernet networking system, or a personal-area networking (PAN) system. Networking subsystem 106 also includes controllers/processors, radios/antennas for wireless network connections, sockets/plugs for wired network connections, and/or other devices and software (e.g., firmware, drivers, etc.) used for coupling to, communicating on, and handling data and events on wired and/or wireless networks.

Display subsystem 108 comprises one or more circuits, mechanisms, computer-readable storage mediums, and/or functional blocks configured to render information on at least one screen or other interface (e.g., light-emitting diodes, transducer, etc.) for computing device 100. For example, display subsystem 108 may include a screen upon which display subsystem 108 renders information (e.g., graphics, text, etc.).

Within computing device 100, processing subsystem 102, memory subsystem 104, networking subsystem 106, and display subsystem 108 are coupled together by bus 110. Bus 110 comprises electrical, optical, electro-optical, etc. connection(s) that the subsystems can use to communicate.

Although shown as separate subsystems in FIG. 1, in some embodiments, some or all of a given subsystem can be integrated into one or more of the other subsystems in computing device 100. For example, as described above, some or all of memory subsystem 104 (e.g., caches, controllers, etc.) can be incorporated into processing subsystem 102.

Computing device 100 can be, or can be incorporated into, many different types of electronic devices. Generally, these electronic devices include any device that can perform the operations herein described. For example, computing device 100 can be or can be part of a desktop computer, a laptop computer, a server computer, a media player, an appliance, a subnotebook/netbook computer, a tablet computer, a smart phone, testing equipment, a network appliance, a set-top box, a personal digital assistant (PDA), a toy, and/or a controller.

Although computing device is described using the illustrated components and subsystems, in some embodiments, different components and/or subsystems may be present in computing device 100. For example, computing device 100 may include one or more additional processing subsystems 102, memory subsystems 104, and/or networking subsystems 106. As another example, one or more of the subsystems may not be present in computing device 100. As yet another example, in some embodiments, computing device 100 may include one or more additional subsystems that are not shown in FIG. 1. For example, computing device 100 may include an input/output (I/O) subsystem, a data collection subsystem, an audio subsystem, an alarm subsystem, and/or a media processing subsystem.

System

As described above, in the described embodiments, a computing device communicates with one or more other computing devices to acquire a bootstrap configuration and, using information from the bootstrap configuration, to acquire a device configuration file that is used to assist in configuring the computing device. FIG. 2 presents block diagram illustrating a system 200 for communicating the bootstrap configuration and the device configuration file in accordance with some embodiments. As can be seen in FIG. 2, in system 200, computing device 202 is coupled to network 204. Network 204 is also coupled to device management server 206, bootstrap configuration server 208, activation server 210, and accounting server 212.

Generally, each of computing device 202, device management server 206, bootstrap configuration server 208, activation server 210, and accounting server 212 are computing devices configured to perform the operations herein described as being performed by the corresponding computing device. Each of computing device 202, device management server 206, bootstrap configuration server 208, activation server 210, and accounting server 212 comprise mechanisms (circuits, functional blocks, etc.) configured to perform the corresponding operations. For example, in some embodiments, some or all of computing device 202, device management server 206, bootstrap configuration server 208, activation server 210, and accounting server 212 include subsystems similar to the subsystems in computing device 100.

Computing device 202 is a computing device (e.g., a tablet computer, a laptop computer, and/or another computing device) for which an entity controls configuration settings. In these embodiments, the entity may be an entity other than a user of computing device 202 (e.g., an owner or administrator of computing device 202). For example, in some embodiments, computing device 202 is a laptop computer owned by a business that is provided to an employee for business use. In this embodiment, the business is the entity that controls the configuration settings—and thus dictates how the configuration settings are set on the computing device 202. For example, the business may control how network settings, network proxy or DNS server identifiers, usage restrictions, calendar information, and/or other configuration settings are set on computing device 202. As another example, in some embodiments, computing device 202 is a tablet computer that is provided to students of a school and the school controls the configuration settings.

Network 204 is an electronic communication network. Generally, network 204 may include any network or combination of networks (each including switches, routers, network processors, controllers, wires/fibers, etc.) that enables communication between devices coupled to network 204. For example, in some embodiments, network 204 comprises one or more of a cellular network (e.g., EDGE, UMTS, HSDPA, LTE, etc.), a network based on the standards described in IEEE 802.11 (e.g., an 802.11 wireless network), an optical fiber network, an Ethernet network, and/or other wired and/or wireless networks or combinations thereof. In some embodiments, network 204 at least in part includes the Internet, a wide area network (WAN), a corporate or governmental intranet, and/or another larger network. As an example, in some embodiments, computing device 202 and device management server 206 are coupled to a corporate intranet that is coupled to the Internet and bootstrap configuration server 208, activation server 210, and accounting server 212 are located in "the cloud" (e.g., are implemented on one or more servers coupled to the Internet and available for performing the operations herein described). As another example, in some embodiments, computing device 202 is coupled to the Internet (e.g., via a cellular network or WiFi connection), device management server 206 is coupled to an intranet that is coupled to the Internet, and bootstrap configuration server 208, activation server 210, and accounting server 212 are located in the cloud.

Device management server 206 is a computing device (e.g., a server computer, a desktop computer, and/or another computing device) that performs operations for an entity that controls configuration settings for computing device 202. In some embodiments, these operations include hosting a device configuration file that includes data/information to be used in setting or updating configuration settings in computing device 202. As an example, in some embodiments, device management server 206 is a server computer that is operated by a business (i.e., the entity) that controls the configuration settings of one or more computing devices (e.g., laptops, tablet computers, etc.) that are owned by (or are otherwise controlled by) the business, but are used by employees. As another example, in some embodiments, device management server 206 is a desktop computer that is operated by an institution (i.e., the entity) that controls the configuration settings of one or more computing devices that have been provided to members of the institution. In some embodiments, device management server also performs operations such as uploading/sending a list of devices and/or a bootstrap configuration to bootstrap configuration server 208, determining the reference to the location for the bootstrap configuration, etc.

Bootstrap configuration server 208 is a computing device (e.g., a server computer, a desktop computer, and/or another computing device) that provides a service (e.g., executes program code, which causes bootstrap configuration server 208 to provide the service) that enables entities to use bootstrap configuration server 208 to provide a bootstrap configuration to computing devices for which the entity controls the configuration. As described above, the bootstrap configuration comprises a reference to a location (e.g., a URL or address) where the device configuration file is hosted by device management server 206 that is used by computing device 202 to acquire the device configuration file. As an example, in some embodiments, bootstrap configuration server 208 is a commercial server computer (e.g., in the cloud, accessible on the Internet, etc.) that provides a website or another interface that enables an entity (e.g., via device management server 206) to send the bootstrap configuration to bootstrap configuration server 208 for storage on bootstrap configuration server 208 and to manage computing devices that are permitted to acquire the bootstrap configuration from bootstrap configuration server 208, enables computing device 202 to acquire the bootstrap configuration, and performs other operations herein described.

Activation server 210 is a computing device (e.g., a server computer, a desktop computer, and/or another computing device) that provides a service that enables computing device 202 to perform operations related to the initial activation and re-activation of computing device 202. In some embodiments, these operations comprise sending a message to computing device 202 during an activation process that indicates that computing device 202 should communicate with bootstrap configuration server 208 to acquire a bootstrap configuration. As an example, in some embodiments, activation server 210 is a commercial server computer (e.g., in the cloud, accessible on the Internet, etc.) that provides a website or another interface that enables computing device 202 to perform the operations related to initial activation and re-activation of computing device 202 and performs other operations herein described.

Accounting server 212 is a computing device (e.g., a server computer, a desktop computer, and/or another computing device) performs services for managing and accounting for device purchases and sales for a commercial enterprise. In some embodiments, accounting server 212 communicates with bootstrap configuration server 208 to provide information about computing devices that should be provided with a bootstrap configuration. As an example, in some embodiments, activation server 210 is a private server computer (e.g., a server computer operated by an entity that operates one or more of activation server 210 and bootstrap configuration server 208) that provides a list of purchased devices to bootstrap configuration server 208 and performs other operations herein described.

In some embodiments, one or more of computing device 202, device management server 206, bootstrap configuration server 208, activation server 210, and accounting server 212 provides an interface (e.g., a website, a program interface, a command-line interface, etc.) on a display of the device or elsewhere (e.g., on a display of another device) that may be used by a user of the device (e.g., an administrator may use device management server 206, a user may use computing device 202, etc.) to perform operations relating to the management of computing devices that may acquire a bootstrap configuration (e.g., account setup and verification, device list updates, etc.) and/or the device configuration file. For example, computing device 202 may provide a configuration interface that includes one or more displays on a screen of computing device 202 for explaining, controlling, etc. an initial configuration and/or a re-configuration of computing device 202, including acquiring and using a device configuration file. As another example, bootstrap configuration server 208 may provide a web page and/or program interface for activating an account for an entity, updating devices that may access the bootstrap configuration (e.g., generating and sending a list of devices to bootstrap configuration server 208), uploading/sending the bootstrap configuration to bootstrap configuration server 208, etc.

Although system 200 is described using certain devices (servers, etc.), in some embodiments, system 200 includes a different number or arrangement of devices and/or the devices perform different operations. For example, in some embodiments, some or all of the operations described herein as being performed by device management server 206 are performed by bootstrap configuration server 208 (e.g., bootstrap configuration server 208 performs some or all of the operations herein described as being performed by device management server 206). In these embodiments, device management server 206 may not be present in system 200 or may only be a desktop computer used to interact with bootstrap configuration server 208. As another example, some embodiments do not use activation server 210 as described. In these embodiments, computing device 202 may automatically check with bootstrap configuration server 208 to determine if a bootstrap configuration is available, without being instructed to do so by activation server 210. For example, computing device 202 may determine that communication with activation server 210 is not to be performed based on a hardware profile or operating system for computing device 202, available networks, a physical location of computing device 202, etc. As yet another example, accounting server 212 may be coupled to additional servers (not shown) that enable purchasing devices from an online store or via inside sales, keep records of purchased devices/devices shipped from a factory, etc.

Although only one computing device 202 is shown in FIG. 2, some embodiments include multiple computing devices for which configuration settings are controlled by an entity (e.g., a business, an institution, etc.). In these embodiments, device management server 206 or another computing device may communicate identifiers for each of the multiple computing devices (e.g., in a list of devices) to bootstrap configuration server 208 along with an indication that a corresponding bootstrap configuration should be sent to each of the multiple computing devices during an initial configuration or re-configuration. This causes bootstrap configuration server 208 to provide the bootstrap configuration to each of the multiple computing devices upon receiving an associated request from each computing device during an initial configuration or re-configuration of the computing device. The bootstrap configuration is then used by each computing device to retrieve a device configuration file for use in configuring the computing device. In this way, the entity can control the configuration of multiple computing devices using the service provided by bootstrap configuration server 208.

Communications Between Computing Devices

Figure 3:
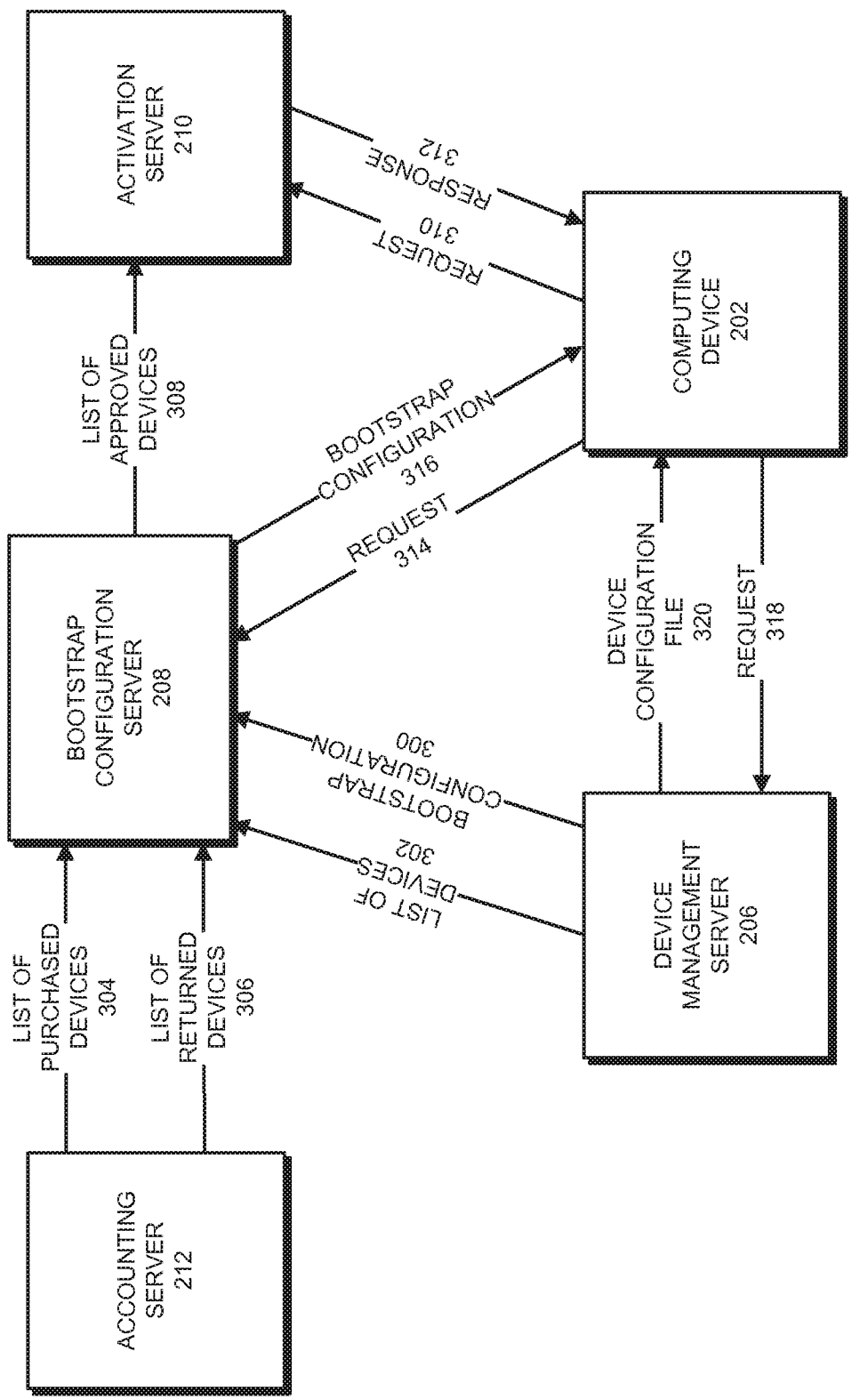
FIG. 3 presents a block diagram of communications between various computing devices in accordance with some embodiments.

In the described embodiments, bootstrap configuration server 208 sends a bootstrap configuration to computing device 202 during an initial configuration or a re-configuration of computing device 202. Computing device 202 then uses the bootstrap configuration to acquire a device configuration file from device management server 206. Computing device 202 subsequently uses information from the device configuration file to set configuration settings in computing device 202. FIG. 3 presents a block diagram of communications between various computing devices in accordance with some embodiments. More specifically, the communications in FIG. 3 are performed to facilitate the communication of the bootstrap configuration and the device configuration file.

Note that the operations shown in FIG. 3 are presented as a general example of the operations performed by some embodiments. The operations performed by other embodiments include different operations and/or operations that are performed in a different order. Additionally, although certain mechanisms are used in describing the operations, in some embodiments, other mechanisms can perform the operations.

The communications shown in FIG. 3 are generally formatted in accordance with a communication protocol used for communicating between the corresponding computing devices using network 204. For example, a packet, protocol data unit, message, etc. in which each communication is contained is formatted (e.g., with headers, metadata, etc.) to enable the sending computing device to send the communication to the appropriate destination computing device, as well as enabling network 204 (i.e., devices on network 204) and the destination computing device to properly route and interpret the communication.

In some embodiments, the communications between the computing devices include device management server 206 sending a bootstrap configuration 300 and a list of devices 302 to bootstrap configuration server 208. In some embodiments, when sending the bootstrap configuration 300 and the list of devices 302 to bootstrap configuration server 208, a user of device management server 206 uses an interface (e.g., a web page, an application interface, etc.) to cause the bootstrap configuration 300 and the list of devices 302 to be uploaded or otherwise sent from device management server 206 to bootstrap configuration server 208. However, the interface is not required; device management server 206 may use any type of electronic message, packet, etc. to send bootstrap configuration 300 and the list of devices 302 (separately or together) to bootstrap configuration server 208 via network 204.

Bootstrap configuration 300 includes a reference to a location on device management server 206 from where a device configuration file may be retrieved. FIG. 4 presents a block diagram illustrating bootstrap configuration 300 in accordance with some embodiments. As can be seen in FIG. 4, bootstrap configuration 300 includes metadata 400, reference to location 402, and configuration information 404. Metadata 400 includes information about bootstrap configuration 300, such as a source of bootstrap configuration 300, an expiration date, an identifier for bootstrap configuration 300, information for verifying and/or authenticating bootstrap configuration 300 (e.g., digital signatures, etc.), an identifier for the corresponding device configuration file, and/or other information. In some embodiments, reference to location 402 includes an indication of a location on device management server 206 where the device configuration file is hosted (e.g., made available for acquisition). For example, reference to location 402 may include one or more of a universal resource locator (URL), an absolute or relative address (e.g., internet protocol (IP) address, etc.), an absolute or relative directory name or reference, a machine reference, a custom address indicator, an absolute or relative pointer or reference to a memory location where an address or location on the device management server 206 is stored (or a device from which the reference to the location can be acquired), etc. In some embodiments, configuration information 404 includes configuration information to be used in combination with (or in addition to configuration settings in device configuration file 320 (e.g., configuration settings 702-706, as described below). For example, configuration information 404 may include information about an entity that controls configuration of user device 202 (e.g., the entity's name, an identification of an administrator/manager for the entity, etc.), information indicating one or more configuration settings in device configuration file 320 that are mandatory or can be overridden or ignored by a user of computing device 202 during configuration, etc. In some embodiments, configuration information 404 is optional, in that bootstrap configuration 300 may support adding configuration information 404, but that none may be present when no need exists for such configuration information.

Note that, although reference to location 402 is described as a location on device management server 206 where a device configuration file is hosted, in some embodiments, a different location is used for hosting device configuration file. For example, in some embodiments, bootstrap configuration server 208 (or another computing device) hosts a device configuration file. In these embodiments, reference to location 402 indicates the location of the device configuration file on the corresponding computing device. These embodiments enable bootstrap configuration server 208 (or the other computing device) to perform some or all of the operations described herein as being performed by device management server 206 (e.g., providing the device configuration file, etc.).

In some embodiments, bootstrap configuration 300 is implemented in a file that may be generated by device management server 206 and/or another computing device and read/interpreted by computing device 202. For example, bootstrap configuration 300 may be implemented as an Extensible Markup Language (XML) or JavaScript Object Notation (JSON) file that includes one or more fields or key-value pairs, with a field or key-value pair holding reference to location 402 and zero or more field or key-value pairs holding configuration information 404 (recall that configuration information 404 is optional).

List of devices 302 includes a list of computing devices that are to be allowed to access bootstrap configuration 300 on bootstrap configuration server 208 (e.g., to acquire bootstrap configuration 300 from bootstrap configuration server 208). FIG. 5 presents a block diagram illustrating list of devices 302 in accordance with some embodiments. As can be seen in FIG. 5, list of devices 302 includes metadata 500 and a number of device identifiers 502-506 with corresponding bootstrap configuration identifiers (BSC) 508-512. Metadata 500 includes information about list of devices 302, such as a source of list of devices 302, an expiration date, an identifier for list of devices 302, information for verifying and/or authenticating list of devices 302 (e.g., digital signatures, etc.), and/or other information. Each device identifier 502-506 includes an identifier for a different computing device such as some or all of a unique identifier for the device, a media access control (MAC) address for the device, a system profile identifier for the device, a user identifier for a user of the device, etc. Each bootstrap configuration identifier 508-512 includes an identifier for a bootstrap configuration 300 that is to be provided to the device indicated in the corresponding device identifier 502-506.

Returning to FIG. 3, in some embodiments, the communications include accounting server 212 sending a list of purchased devices 304 and/or a list of returned devices 306 to bootstrap configuration server 208. List of purchased devices 304 and list of returned devices 306 comprise identifiers for computing devices that have been purchased and returned, respectively, by an entity that controls the configuration of the computing devices. When a computing device is both purchased (and hence appears in list of purchased devices 304) and appears in list of devices 302, the computing device is placed in a list of approved devices (described below). However, when a computing device is returned (and hence appears in list of returned devices 306), the computing device is removed from (or not placed in) the list of approved devices. In this way, bootstrap configuration server 208 may verify that computing devices on list of devices 302 should be allowed to access bootstrap configuration 300. FIG. 6 presents a block diagram illustrating list of purchased devices 304 in accordance with some embodiments. (Note that list of returned devices 306 is not shown, but the information in list of returned devices 306 may be formatted similarly to list of purchased devices 304.) As can be seen in FIG. 6, list of purchased devices 304 includes metadata 600 and a number of device identifiers 602-606. Metadata 600 includes information about list of purchased devices 304, such as a source of list of purchased devices 304, an expiration date, an identifier for list of purchased devices 304, information for verifying and/or authenticating list of purchased devices 304 (e.g., digital signatures, etc.), and/or other information. Each device identifier 602-606 includes an identifier for a different device such as some or all of a unique identifier for the device, a media access control (MAC) address for the device, a system profile identifier for the device, a user identifier for a user of the device, etc.

In some embodiments, the communications include bootstrap configuration server 208 sending a list of approved devices 308 to activation server 210. The list of approved devices 308 comprises identifiers for computing devices that appear on both list of purchased devices 304 (i.e., have been purchased) and list of devices 302 (i.e., have been indicated by a corresponding entity to be allowed to access bootstrap configuration 300). Thus, list of approved devices 308 is a list of devices that have been verified as purchased and have been indicated to be allowed access to bootstrap configuration 300. A figure illustrating list of approved devices 308 is not presented, but the information in list of approved devices 308 may be formatted similarly to list of purchased devices 304.

In some embodiments, as computing device 202 is initially activated or re-activated (collectively, "activated"), computing device 202 and activation server 210 exchange communications including request 310 and response 312. Request 310 includes an inquiry as to whether computing device 202 is listed in list of approved devices 308 and therefore should acquire bootstrap configuration 300 from bootstrap configuration server 208. Response 312 includes a response to the inquiry indicating that computing device 202 is either included or not included in list of approved devices 308. Based on response 312, computing device 202 sends (or doesn't send) request 314 to bootstrap configuration server 208. When computing device 202 does not send request 314, no bootstrap configuration 300 is acquired from bootstrap configuration server 208 and computing device 202 may therefore not acquire device configuration file 320.

Note that, in some embodiments, the communications between activation server 210 and computing device 202 during the activation process do not include request 310 and response 312. In these embodiments, computing device 202 may simply (and automatically) send a general request for a bootstrap configuration 300 and bootstrap configuration server 208 may respond with bootstrap configuration 316.

In some embodiments, after receiving response 312 and determining from response 312 that computing device 202 is in list of approved devices 308, computing device 202 sends request 314 to bootstrap configuration server 208. Request 314 includes a request for bootstrap configuration server 208 to return bootstrap configuration 316 (which is numbered differently than bootstrap configuration 300 for clarity, but otherwise includes the same information).

After receiving bootstrap configuration 316, computing device 202 uses reference to location 402 from bootstrap configuration 316 to send request 318 to device management server 206 to acquire device configuration file 320. More specifically, using the location indicated by reference to location 402, computing device 202 generates a request 318 for device configuration file 320. Computing device 202 then sends request 318 to device management server 206 and device management server 206 responds with device configuration file 320.

Computing device 202 then uses device configuration file 320 for setting one or more configuration settings in computing device 202. Generally, device configuration file 320 contains various information used for determining how the configuration setting should be set in computing device 202. For example, device configuration file 320 may include device settings used by applications (e.g., email server identifier, location services settings, diagnostics settings, calendar information, etc.), system software settings (e.g., operating system, driver, software environment, or firmware settings, network settings, a network proxy identification, usage restrictions, etc.), system hardware settings (e.g., interface, circuit, processor, etc. configuration settings, pairing limitations, etc.), and/or other configuration settings. FIG. 7 presents a block diagram illustrating device configuration file 320 in accordance with some embodiments. As can be seen in FIG. 7, device configuration file 320 includes metadata 700 and a number of configuration settings 702-706. Metadata 700 includes information about device configuration file 320, such as a source of device configuration file 320, an expiration date, an identifier for device configuration file 320, information for verifying and/or authenticating device configuration file 320 (e.g., digital signatures, etc.), and/or other information. Each configuration setting 702-706 includes an identification of the corresponding configuration setting, one or more values to be used in setting the configuration setting, an indication of whether using the one or more values is mandatory or can be overridden or ignored by a user of computing device 202 during configuration, and/or other information to be used when setting the configuration setting.

In some embodiments, device configuration file 320 comprises only one configuration setting, which is an enrollment setting that causes computing device 202 to enroll in a device management service provided by device management server 206. In these embodiments, while configuring computing device 202, computing device 202 uses the enrollment setting to communicate with device management server 206 to enroll in the device management service. In some of these embodiments, configuration information 404 contains configuration settings that are used to otherwise configure computing device 202.

In some embodiments, device configuration file 320 is implemented in a file that may be generated by device management server 206 and/or another computing device and read/interpreted by computing device 202. For example, device configuration file 320 may be implemented as an XML or JSON file that includes one or more fields or key-value pairs, each field or key-value pair holding corresponding configuration information (e.g., information to be used to determine how a configuration setting is to be set) to be used when configuring computing device 202.

When setting a configuration setting in computing device 202, computing device 202 sets or updates one or more values for one or more of a variable (e.g., a registry key, an environment variable, etc.), an application setting (e.g., a setting in a file, a setting for the application in an operating system, etc.), a hardware setting (e.g., a register, a memory location, etc.), and/or another configuration setting in computing device 202. Computing device 202 then uses the configuration setting as appropriate during subsequent operations. For example, one of the configuration settings can be an identifier for a corporate email server, which an email application on computing device 202 can use during operation. As another example, the configuration settings can include a wireless network identifier (e.g., SSID, etc.) and a password, and computing device 202 can use the network identifier and password to join the wireless network.

Figure 8A:
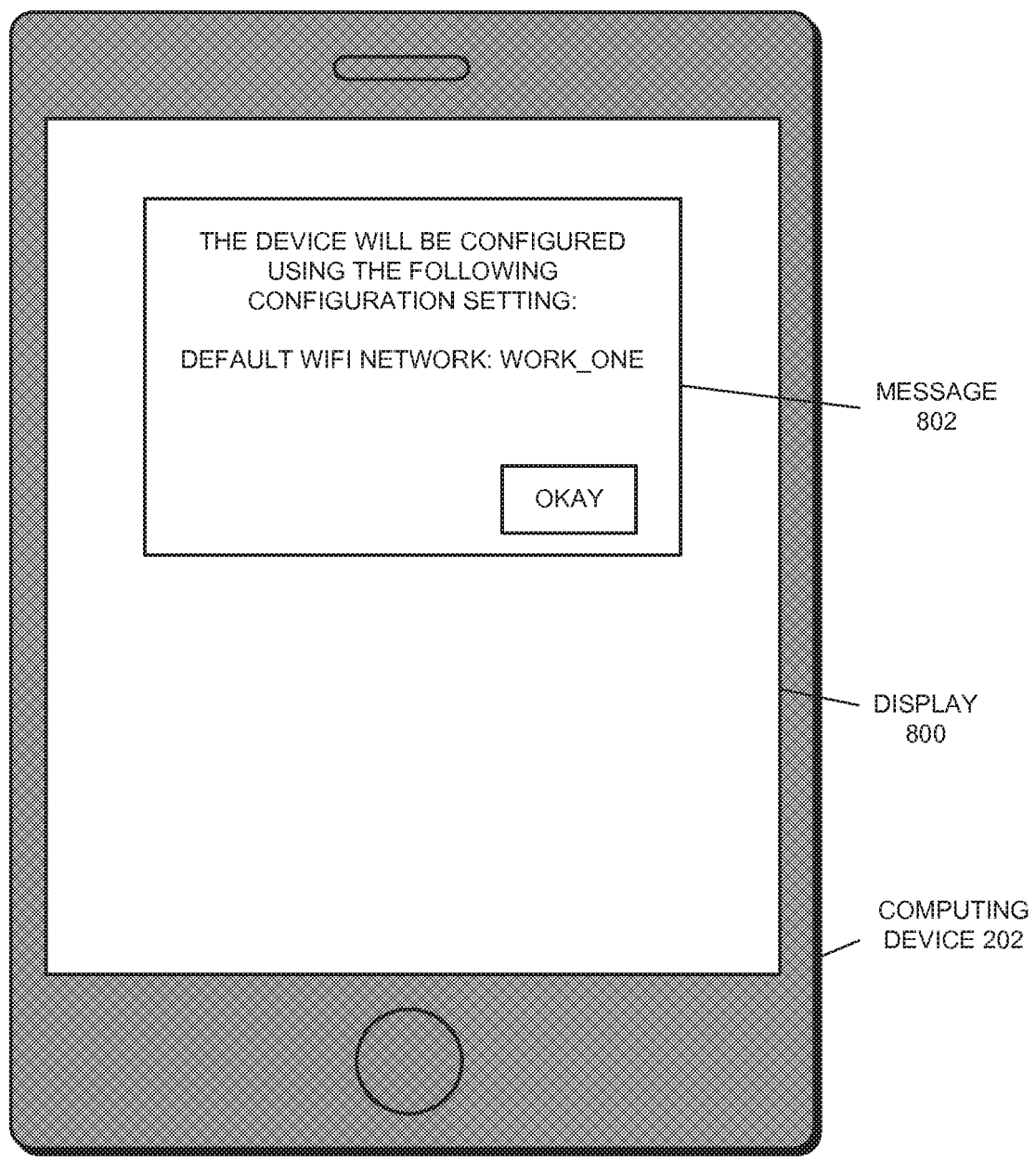
FIGS. 8A and 8B (collectively, "FIG. 8") present a block diagram illustrating messages presented on a display of a computing device for a mandatory and for a voluntary configuration setting in accordance with some embodiments.
Figure 8B:
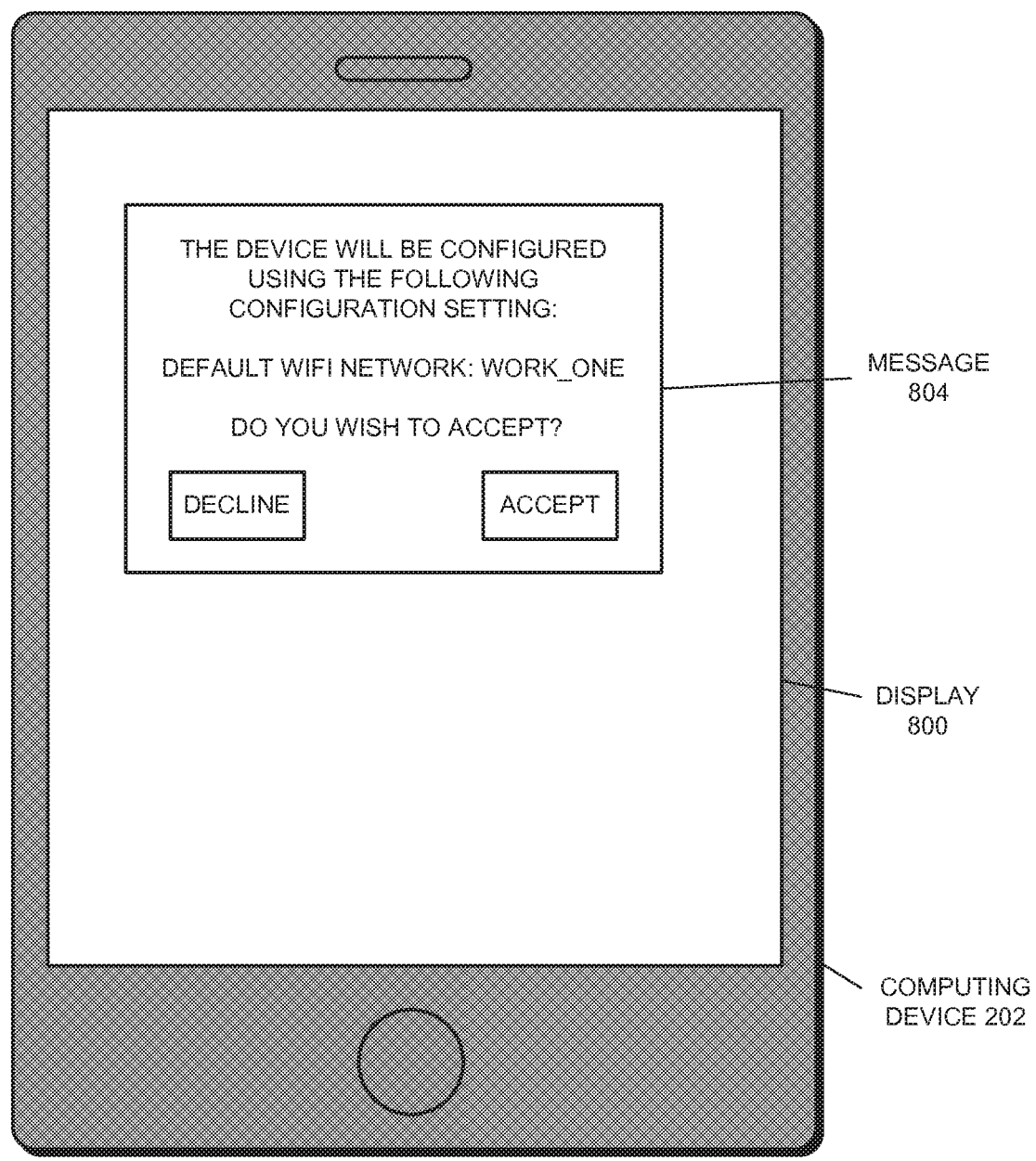

As described, in some embodiments, one or more of the configuration settings is voluntary, in that a user of computing device 202 may override or ignore the configuration settings. However, the configuration settings may be involuntary/forced, in that the user of computing device 202 is not presented with the opportunity to override or ignore the configuration settings. FIGS. 8A and 8B present a block diagram illustrating messages presented on a display 800 of a computing device 202 for a mandatory (message 802) and for a voluntary (message 804) configuration setting, respectively, in accordance with some embodiments. Note that messages are optional, and hence may not be presented, for mandatory configuration settings. Additionally, messages 802 and 804 may be replaced with other messages in some embodiments. In embodiments where at least some of the configuration settings are mandatory, computing device 202 may perform operations during the configuration operation (i.e., an initial configuration operation and/or a re-configuration operation) to prevent a user from evading acceptance of the mandatory configuration settings. For example, computing device 202 may prevent the device from being used normally (e.g., lock the device, make certain functions of the device unusable, etc.) until mandatory configuration settings are accepted.

In FIG. 3, the illustrated communications are presented to enable explaining operations performed by some embodiments. However, some embodiments include communications that are not shown in FIG. 3. For example, error messages or requests for re-sending previous messages may be exchanged when communications are corrupted or incorrect. As another example, one or more verification or authentication communications may be exchanged along (or as part of) the illustrated communications. For example, each request in FIG. 3 could be accompanied by sending computing device information that a receiving computing device uses to authenticate or verify the identity of the sending computing device. Generally, the described embodiments exchange sufficient communications to enable the operations herein described.

In some embodiments, a user of computing device 202 is particularly identified (e.g., by account name, a user identifier, etc.) when communications are exchanged between computing devices as shown in FIG. 3. Using the identification of the user, one or more of bootstrap configuration 316 or device configuration file 320 can be configured to cause user-specific configuration settings to be used in computing device 202. For example, device management server 206 may hold different configuration settings in device configuration file 320 for users with different devices, requirements, etc. that are accessed according to an identification of the user.

In addition, list of devices 302, list of purchased devices 304, and device configuration file 320 are illustrated with a given amount of information (e.g., device identifiers 602-606 in list of purchased devices 304), however, the lists and device configuration file 320 are not limited to these number of entries, as is shown by the ellipsis in each of the figures. Generally, the lists and device configuration file 320 may include any number of entries sufficient to perform the operations herein described (e.g., device configuration file 320 may include more or less configuration settings).

Adoption of Devices

In some embodiments, bootstrap configuration server 208, device management server 206, and/or another computing device include mechanisms that enable existing computing devices to be adopted by an entity. As used here, "adoption" includes an entity asserting that an existing computing device (e.g., a tablet computer, laptop, etc., including possibly a purchased used computing device) should be associated with an account for the entity and thus is a valid candidate for receiving bootstrap configuration 300 from bootstrap configuration server 208. This in turn indicates that the existing/adopted device is permitted to use reference to location 402 in bootstrap configuration 300 to acquire device configuration file 320. In some embodiments, when a computing device is adopted, the computing device is added to list of purchased devices 304, although in some embodiments, a separate list (e.g., a list of adopted devices, etc.) may be used and the separate list may be used in combination with list of purchased devices 304.

In some embodiments, bootstrap configuration server 208 and/or another computing device provides an interface (e.g., a web page, application interface, etc.) that can be used to perform operations for adopting a device. In addition, in some embodiments, bootstrap configuration server 208 and/or another computing device performs verification and/or authentication operations (e.g., using a shared secret, key, etc.) to verify that an entity is actually adopting a particular computing device.

Process for Using a Bootstrap Configuration and a Device Configuration File

Figure 9:
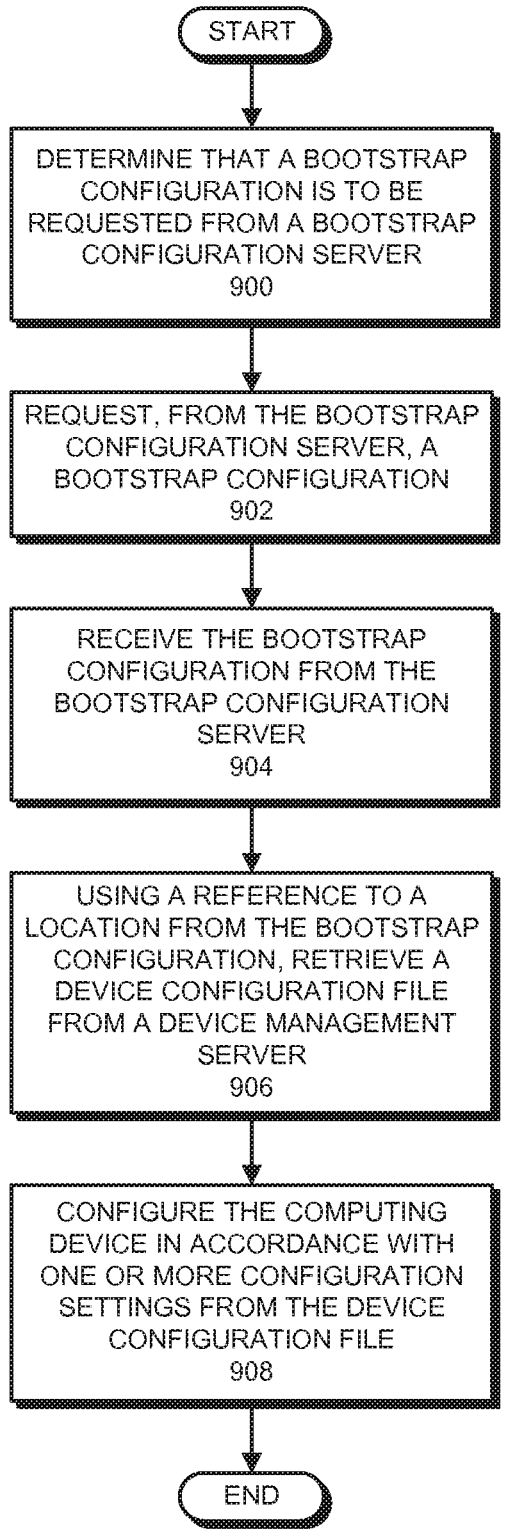
FIG. 9 presents a flowchart illustrating a process for configuring a computing device in accordance with some embodiments.

FIG. 9 presents a flowchart illustrating a process for configuring computing device 202 in accordance with some embodiments. Note that the operations shown in FIG. 9 are presented as a general example of functions performed by some embodiments. The operations performed by other embodiments include different operations and/or operations that are performed in a different order. Additionally, although certain devices (bootstrap configuration server 208, computing device 202, etc.) are used in describing the process, in some embodiments, other devices and/or mechanisms can perform the operations.

The process shown in FIG. 9 starts when, during an initial configuration or a re-configuration operation, computing device 202 determines that bootstrap configuration 316 is to be requested from bootstrap configuration server 208 (step 900). For example, in some embodiments, computing device 202 sends request 310 to activation server 210 to request a response indicating whether or not computing device 202 should contact bootstrap configuration server 208 to request bootstrap configuration 316. Activation server 210 then returns response 312, which indicates whether or not computing device 202 should contact bootstrap configuration server 208 to request bootstrap configuration 316. As another example, in some embodiments, computing device 202 determines from another source (including computing device 202 itself) that computing device 202 should contact bootstrap configuration server 208 to request bootstrap configuration 316. For this example, and as described in step 900, it is assumed that bootstrap configuration server 208 hosts a bootstrap configuration 316 for computing device 202, and thus computing device 202 should contact bootstrap configuration server 208 to request bootstrap configuration 316. (If computing device 202 was not to request bootstrap configuration 316, the initial configuration or a re-configuration operation may proceed without bootstrap configuration 316 and thus without using device configuration file 320 as described below.)

Computing device 202 then requests, from bootstrap configuration server 208, bootstrap configuration 316 (step 902). For example, computing device 202 can send request 314 to bootstrap configuration server 208 to request bootstrap configuration 316. In response to the request, computing device 202 receives bootstrap configuration 316 from bootstrap configuration server 208 (step 904). Recall that bootstrap configuration 300 and bootstrap configuration 316 include the same information, but are numbered differently for the purpose of this description.

Next, using reference to location 402 from bootstrap configuration 316, computing device 202 retrieves device configuration file 320 from device management server 206 (step 906). For example, in some embodiments, computing device 202 sends request 318 to device management server 206 to request device configuration file 320 from device management server 206. In these embodiments, request 318 is sent to the location indicated by reference to location 402 and/or indicates the location indicated by reference to location 402. For example, in embodiments where reference to location 402 is a URL, request 318 can be directed to the URL or indicate the location indicated by reference to location 402. In response to request 318, computing device 202 receives device configuration file 320 from device management server 206.

Recall that, in some embodiments, device management server 206 is operated, or performs operations for, an entity that controls configuration settings for computing device 202. For example, a business that owns or otherwise controls configuration settings for computing device 202 (which may be possessed/used by an employee of the business) may operate device management server 206. Using device management server 206 in this way enables the entity to more easily control and administer the configuration of computing devices such as computing device 202.

Although embodiments are described in which device management server 206 hosts device configuration file 320, in some embodiments, bootstrap configuration server 208 functions as a single location for hosting both bootstrap configuration 316 and device configuration file 320. Thus, in these embodiments, bootstrap configuration 316 may indicate a location on bootstrap configuration server 208 where device configuration file 320 is hosted. In these embodiments, bootstrap configuration server 208 serves as a single point of contact for administering (e.g., provides a web page or a program interface that an entity can use to perform some or all of the operations herein described) and hosting device configuration file 320 and the bootstrap configuration 316, which can avoid the need for an entity to provide/maintain device management server 206. In some of these embodiments, operations are similar to the operations shown in FIG. 9, with an exception being that bootstrap configuration server 208 performs at least some of the operations shown for device management server 206.

Computing device 202 then configures computing device 202 in accordance with one or more configuration settings (e.g., configuration settings 702-706) from device configuration file 320 (step 908). For example, during the initial configuration operation or the re-configuration operation, computing device 202 can set one or more hardware, operating system, and/or software settings in accordance with corresponding configuration settings from device configuration file 320. In this way, configuration settings in computing device 202 can be set as intended by the entity that created device configuration file 320. For example, a business can include one or more usage restrictions in device configuration file 320 to be used to set configuration settings in computing device 202 to restrict corresponding usage of computing device 202 during subsequent operation.

As described above, in some embodiments, bootstrap configuration 300 includes configuration information 404. In these embodiments, configuration information 404 may be used when configuring computing device 202. For example, configuration information 404 may be used to determine mandatory and/or voluntary configuration settings from device configuration file 320 when configuring user device 202.

In some embodiments, the configuration settings in device configuration file 320 may be mandatory or voluntary. In these embodiments, when a configuration setting is mandatory, the configuration setting is set on computing device 202 without providing a user of computing device 202 an opportunity to decline setting the configuration setting (during the initial configuration operation or re-configuration operation). FIG. 8A presents a message that may be presented on a display of computing device 202 for a mandatory configuration setting in accordance with some of these embodiments. However, when a configuration setting is voluntary, computing device 202 may provide a user of computing device 202 an opportunity to decline setting the configuration setting. FIG. 8B presents a message that may be presented on a display of computing device 202 for a voluntary configuration setting in accordance with some of these embodiments.

Figure 10:
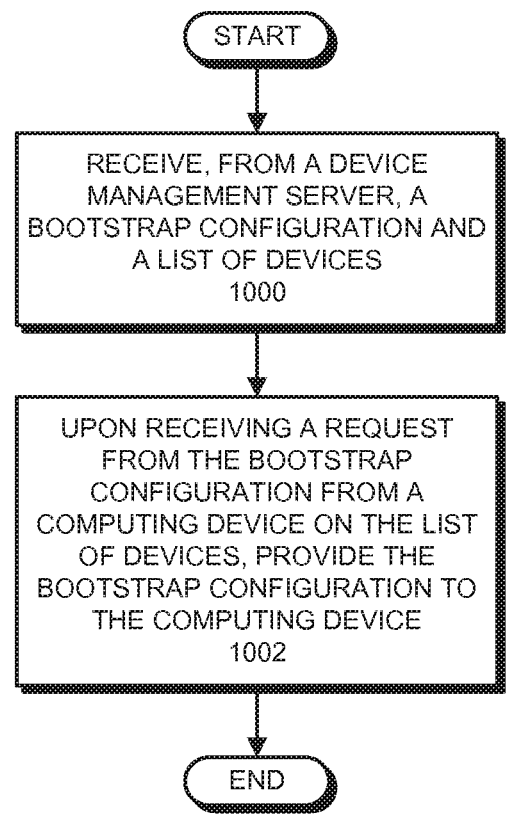
FIG. 10 presents a flowchart illustrating a process for operating a bootstrap configuration server in accordance with some embodiments.

FIG. 10 presents a flowchart illustrating a process for operating bootstrap configuration server 208 in accordance with some embodiments. Note that the operations shown in FIG. 10 are presented as a general example of functions performed by some embodiments. The operations performed by other embodiments include different operations and/or operations that are performed in a different order. Additionally, although certain devices (bootstrap configuration server 208, computing device 202, etc.) are used in describing the process, in some embodiments, other devices and/or mechanisms can perform the operations.

The process shown in FIG. 10 starts when bootstrap configuration server 208 receives, from a device management server 206, bootstrap configuration 300 and list of devices 302 (step 1000). In some embodiments, bootstrap configuration 300 and list of devices 302 are generated/created on the device management server 206. For example, a program such as a text editor or a purpose-specific application (e.g., a device configuration application) may be used to generate/create bootstrap configuration 300 and list of devices 302. Bootstrap configuration 300 and list of devices 302 are then sent to bootstrap configuration server 208. For example, uploaded using a web site or program interface provided by bootstrap configuration server 208. However, in some embodiments, bootstrap configuration 300 and list of devices 302 are generated/created and sent to bootstrap configuration server 208 using an interface (e.g., a web site or program interface) provided by bootstrap configuration server 208.

Next, upon receiving a request from a computing device (e.g., computing device 202) on list of devices 302, bootstrap configuration server 208 provides bootstrap configuration 316 (which contains the same information as bootstrap configuration 300, but is numbered differently for clarity) to the computing device (step 1002). In this operation, bootstrap configuration server 208 receives, in the request, an identifier for the computing device (some or all of a MAC address for the device, a unique identifier for the device, etc.). Bootstrap configuration server 208 compares the identifier to identifiers in list of devices 302 to determine of one of the identifiers in list of devices 302 matches the identifier in the request. If so, bootstrap configuration server 208 provides bootstrap configuration 316 to the computing device. However, if the identifier from the request does not match any identifier from list of devices 302, bootstrap configuration server 208 does not provide bootstrap configuration 316 to the computing device.

Although not shown in FIG. 10, in some embodiments, bootstrap configuration server 208 performs one or more operations to verify that devices on list of devices 302 are to be provided with bootstrap configuration 316. For example, in some embodiments, accounting server 212 sends list of purchased devices 304 and/or list of returned devices 306 to bootstrap configuration server 208. List of purchased devices 304 and/or list of returned devices 306 can be used to verify that computing devices are legitimately included in list of devices 302 and/or to remove computing devices from list of devices 302. In some embodiments, bootstrap configuration server 208 uses list of devices 302 and list of purchased devices 304 and/or list of returned devices 306 to generate list of approved devices 308 that is sent to activation server 210. In these embodiments, activation server 210 may respond to requests from computing devices in list of approved devices 308 with a confirmation that the computing devices should contact bootstrap configuration server 208 to retrieve bootstrap configuration 316.

Figure 11:
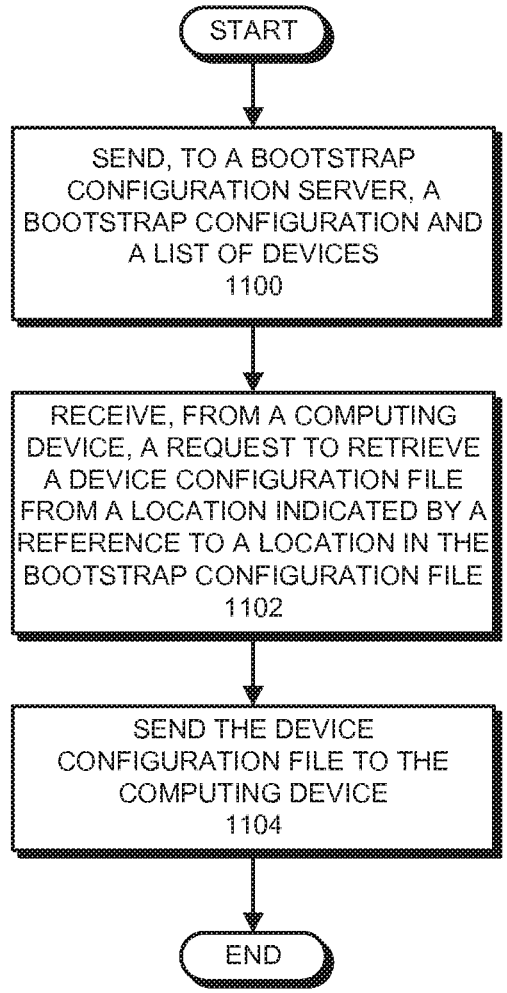
FIG. 11 presents a flowchart illustrating a process for operating a device management server in accordance with some embodiments.

FIG. 11 presents a flowchart illustrating a process for operating device management server 206 in accordance with some embodiments. Note that the operations shown in FIG. 11 are presented as a general example of functions performed by some embodiments. The operations performed by other embodiments include different operations and/or operations that are performed in a different order. Additionally, although certain devices (device management server 206, bootstrap configuration server 208, etc.) are used in describing the process, in some embodiments, other devices and/or mechanisms can perform the operations.

The process shown in FIG. 11 starts when device management server 206 sends, to bootstrap configuration server 208, bootstrap configuration 300 and list of devices 302 (step 1100). As described above, in some embodiments, bootstrap configuration 300 and list of devices 302 are generated/created on the device management server 206. For example, a program such as a text editor or a purpose-specific application (e.g., a device configuration application) may be used to generate/create bootstrap configuration 300 and list of devices 302. Bootstrap configuration 300 and list of devices 302 are then sent to bootstrap configuration server 208 from device management server 206. For example, uploaded using a web site or program interface provided by bootstrap configuration server 208. However, in some embodiments, bootstrap configuration 300 and list of devices 302 are generated/created and sent to bootstrap configuration server 208 using an interface such as a web site or a program interface provided by bootstrap configuration server 208.

In some embodiments, device management server 206 presents an interface (e.g., a graphical user interface (GUI)) for generating/creating and editing bootstrap configuration 300 and/or list of devices 302. For example, device management server can present a web site or program interface hosted by device management server 206 and/or bootstrap configuration server 208 that is used to perform these operations.

In some embodiments, some or all of bootstrap configuration 300 and/or list of devices 302 is automatically created by device management server 206 and/or bootstrap configuration server 208. For example, reference to location 402 may be determined by device management server 206 by determining a location where device configuration file 320 is hosted/provided on device management server 206 and used to add reference to location 402 to bootstrap configuration 300.

Next, device management server 206 receives, from computing device 202, a request to retrieve device configuration file 320 from device management server 206 from a location indicated by reference to location 402 from bootstrap configuration 316 (step 1102). Recall that bootstrap configuration 316 contains similar information to bootstrap configuration 300. Further recall that computing device retrieves bootstrap configuration 316 from bootstrap configuration server 208 as described in FIGS. 9 and 10. Moreover, recall that reference to location 402 may include one or more of a URL, an absolute or relative address, an absolute or relative directory name or reference, etc. that is used for retrieving device configuration file 320 from the location where device configuration file 320 is hosted on device management server 206.

Device management server 206 then sends device configuration file 320 to computing device 202 (step 1104). As described in FIG. 9, device configuration file 320 includes configuration setting information that computing device 202 may use to set corresponding configuration settings on computing device 202.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for configuring a computing device, comprising:
in the computing device, performing operations for:
querying an activation server to determine whether a bootstrap configuration server has a bootstrap configuration for the computing device;
in response to determining that the bootstrap configuration server has the bootstrap configuration for the computing device, sending a device identifier to the bootstrap configuration server; and
receiving, from the bootstrap configuration server, a bootstrap configuration approved for the device identifier based on a list of approved devices, the bootstrap configuration comprising a reference to a location on a device management server from where a device configuration file is to be retrieved.

2. The method of claim 1, wherein the reference to the location is selected from a group consisting of: a directory name, a reference to a machine, a custom address indicator, a pointer to a memory location, a universal resource locator (URL), and an address.

3. The method of claim 1, further comprising:
using the reference to the location, retrieving the device configuration file from the device management server; and
configuring the computing device in accordance with one or more configuration settings in the device configuration file.

4. The method of claim 3, wherein the device configuration file is generated by an entity that controls a configuration of the computing device and comprises one or more configuration settings placed in the device configuration file by the entity that are to be used when configuring the computing device and one or more other computing devices, the one or more configuration settings being selected from a group consisting of: application-specific settings, hardware settings for the computing device, and software settings for the computing device.

5. The method of claim 3, wherein the device configuration file is one of an Extensible Markup Language (XML) or a JavaScript Object Notation (JSON) file that comprises:
a metadata field holding information for authenticating the device configuration file; and
one or more configuration fields, each configuration field holding corresponding configuration information to be used when configuring the computing device.

6. The method of claim 3, wherein the bootstrap configuration is one of an XML or JSON file that comprises at least one field, the at least one field including the reference to the location on the bootstrap configuration server, and wherein the method further comprises:
presenting a graphical user interface (GUI) on a display coupled to the computing device;
indicating, via the GUI, one or more optional configuration settings in the device configuration file that are not mandatory;
indicating, via the GUI, one or more mandatory configuration settings in the device configuration file that are mandatory and are being applied to the computing device;
presenting, via the GUI, a selection mechanism for selecting which of the one or more optional configuration settings are to be applied; and
applying selected optional configuration settings in response to receiving user input via the selection mechanism.

7. The method of claim 1, further comprising, in response to a determination that the bootstrap configuration server does not have the bootstrap configuration for the computing device:
performing a default configuration process for the computing device without receiving the bootstrap configuration.

8. The method of claim 1, further comprising:
sending an inquiry to determine whether the computing device is included in the list of approved devices prior to sending the device identifier to the bootstrap configuration server; and
receiving a response to the inquiry indicating that the computing device is included in the list of approved devices, wherein the device identifier is unique to the computing device.

9. A computing device, comprising:
a processing circuit; and
a computer readable storage medium comprising a set of instructions that when executed by the processing circuit causes the processing circuit to perform operations comprising:
querying an activation server to determine whether a bootstrap configuration server has a bootstrap configuration for the computing device;
in response to determining that the bootstrap configuration server has the bootstrap configuration for the computing device, sending a device identifier to the bootstrap configuration server, the device identifier being unique to the computing device; and
receiving, from the bootstrap configuration server, a bootstrap configuration approved for the device identifier based on a list of approved devices, the bootstrap configuration comprising a reference to a location on a device management server from where a device configuration file is to be retrieved.

10. The computing device of claim 9, wherein the reference to the location is selected from a group consisting of: a directory name, a reference to a machine, a custom address indicator, a pointer to a memory location, a universal resource locator (URL), and an address.

11. The computing device of claim 9, wherein the operations further comprise:
using the reference to the location, retrieving the device configuration file from the device management server; and
configuring the computing device in accordance with one or more configuration settings in the device configuration file.

12. The computing device of claim 11, wherein the device configuration file is generated by an entity that controls a configuration of the computing device and comprises one or more configuration settings placed in the device configuration file by the entity that are to be used when configuring the computing device and one or more other computing devices, the one or more configuration settings being selected from a group consisting of: application-specific settings, hardware settings for the computing device, and software settings for the computing device.

13. The computing device of claim 11, wherein the device configuration file is one of an Extensible Markup Language (XML) or a JavaScript Object Notation (JSON) file that comprises:
a metadata field holding information for authenticating the device configuration file; and
one or more configuration fields, each configuration field holding corresponding configuration information to be used when configuring the computing device.

14. The computing device of claim 11, wherein the bootstrap configuration is one of an XML or JSON file that comprises at least one field, the at least one field including the reference to the location on the bootstrap configuration server, and wherein the operations further comprise:
presenting a graphical user interface (GUI) on a display coupled to the computing device;
indicating, via the GUI, one or more optional configuration settings in the device configuration file that are not mandatory;
indicating, via the GUI, one or more mandatory configuration settings in the device configuration file that are mandatory and are being applied to the computing device;

presenting, via the GUI, a selection mechanism for selecting which of the one or more optional configuration settings are to be applied; and applying selected optional configuration settings in response to receiving user input via the selection mechanism.

15. A non-transitory computer-readable medium comprising a set of instructions that, when executed by a processing circuit of a computing device, causes the processing circuit to perform operations comprising:

querying an activation server to determine whether a bootstrap configuration server has a bootstrap configuration for the computing device;

in response to determining that the bootstrap configuration server has the bootstrap configuration for the computing device, sending a device identifier to the bootstrap configuration server, the device identifier being unique to the computing device; and receiving, from the bootstrap configuration server, a bootstrap configuration approved for the device identifier based on a list of approved devices, the bootstrap configuration comprising a reference to a location on a device management server from where a device configuration file is to be retrieved.

16. The non-transitory computer-readable medium of claim 15, wherein the reference to the location is selected from a group consisting of: a directory name, a reference to a machine, a custom address indicator, a pointer to a memory location, a universal resource locator (URL), and an address.

17. The non-transitory computer-readable medium of claim 15, wherein the operations further comprise:

using the reference to the location, retrieving the device configuration file from the device management server; and configuring the computing device in accordance with one or more configuration settings in the device configuration file.

18. The non-transitory computer-readable medium of claim 17, wherein the device configuration file is generated by an entity that controls a configuration of the computing device and comprises one or more configuration settings placed in the device configuration file by the entity that are to be used when configuring the computing device and one or more other computing devices, the one or more configuration settings being selected from a group consisting of: application-specific settings, hardware settings for the computing device, and software settings for the computing device.

19. The non-transitory computer-readable medium of claim 17, wherein the device configuration file is one of an Extensible Markup Language (XML) or a JavaScript Object Notation (JSON) file that comprises:

a metadata field holding information for authenticating the device configuration file; and one or more configuration fields, each configuration field holding corresponding configuration information to be used when configuring the computing device.

20. The non-transitory computer-readable medium of claim 17, wherein the bootstrap configuration is one of an XML or JSON file that comprises at least one field, the at least one field including the reference to the location on the bootstrap configuration server, and wherein the operations further comprise:

presenting a graphical user interface (GUI) on a display coupled to the computing device;

indicating, via the GUI, one or more optional configuration settings in the device configuration file that are not mandatory;

indicating, via the GUI, one or more mandatory configuration settings in the device configuration file that are mandatory and are being applied to the computing device;

presenting, via the GUI, a selection mechanism for selecting which of the one or more optional configuration settings are to be applied; and applying selected optional configuration settings in response to receiving user input via the selection mechanism.

* * * * *